United States Patent

Nelson et al.

[11] Patent Number: 5,777,101
[45] Date of Patent: *Jul. 7, 1998

[54] ACETYLATION OF LIGNOCELLULOSIC MATERIALS

[75] Inventors: Helen Louise Nelson; David Ian Richards, both of Humberside, Great Britain

[73] Assignee: A-Cell Acetyl Cellulosics AB, Sweden

[*] Notice: The term of this patent shall not extend beyond the expiration date of Pat. No. 5,608,051.

[21] Appl. No.: 682,786
[22] PCT Filed: Feb. 23, 1995
[86] PCT No.: PCT/GB95/00371
  § 371 Date: Jul. 25, 1996
  § 102(e) Date: Jul. 25, 1996
[87] PCT Pub. No.: WO95/23168
  PCT Pub. Date: Aug. 31, 1995

[30] Foreign Application Priority Data

Feb. 24, 1994 [GB] United Kingdom ............ 9403509

[51] Int. Cl.$^6$ ............... C08B 3/00; C07H 1/00
[52] U.S. Cl. ............... 536/56; 536/58; 536/63; 536/115; 536/124; 536/128
[58] Field of Search ............... 536/56, 58, 63, 536/115, 124, 128

[56] References Cited

U.S. PATENT DOCUMENTS 3,720,661  3/1973  Breton et al. .......... 260/227
5,608,051  3/1997  Nelson et al. .......... 536/76

FOREIGN PATENT DOCUMENTS 213252  3/1987  European Pat. Off.
94/09057  4/1994  WIPO.

*Primary Examiner*—John Kight
*Assistant Examiner*—Everett White
*Attorney, Agent, or Firm*—Brooks Haidt Haffner & Delahunty

[57] ABSTRACT

The invention relates to a process for the acetylation of lignocellulosic materials (LM) by (a) bringing the LM into intimate contact with an acetylating agent comprising acetic anhydride as the major component at a temperature from 80°–140° C. and (b) bringing the acetylated LM from step (a) into contact with a heated gas inert under the reaction conditions in a stripper at a temperature above 140° C. and reducing the acetic acid or acetic anhydride content of the acetylated LM produced in step (a) to below 10% by weight by stripping. Products fabricated from LMs so treated are highly dimensionally stable.

14 Claims, 1 Drawing Sheet

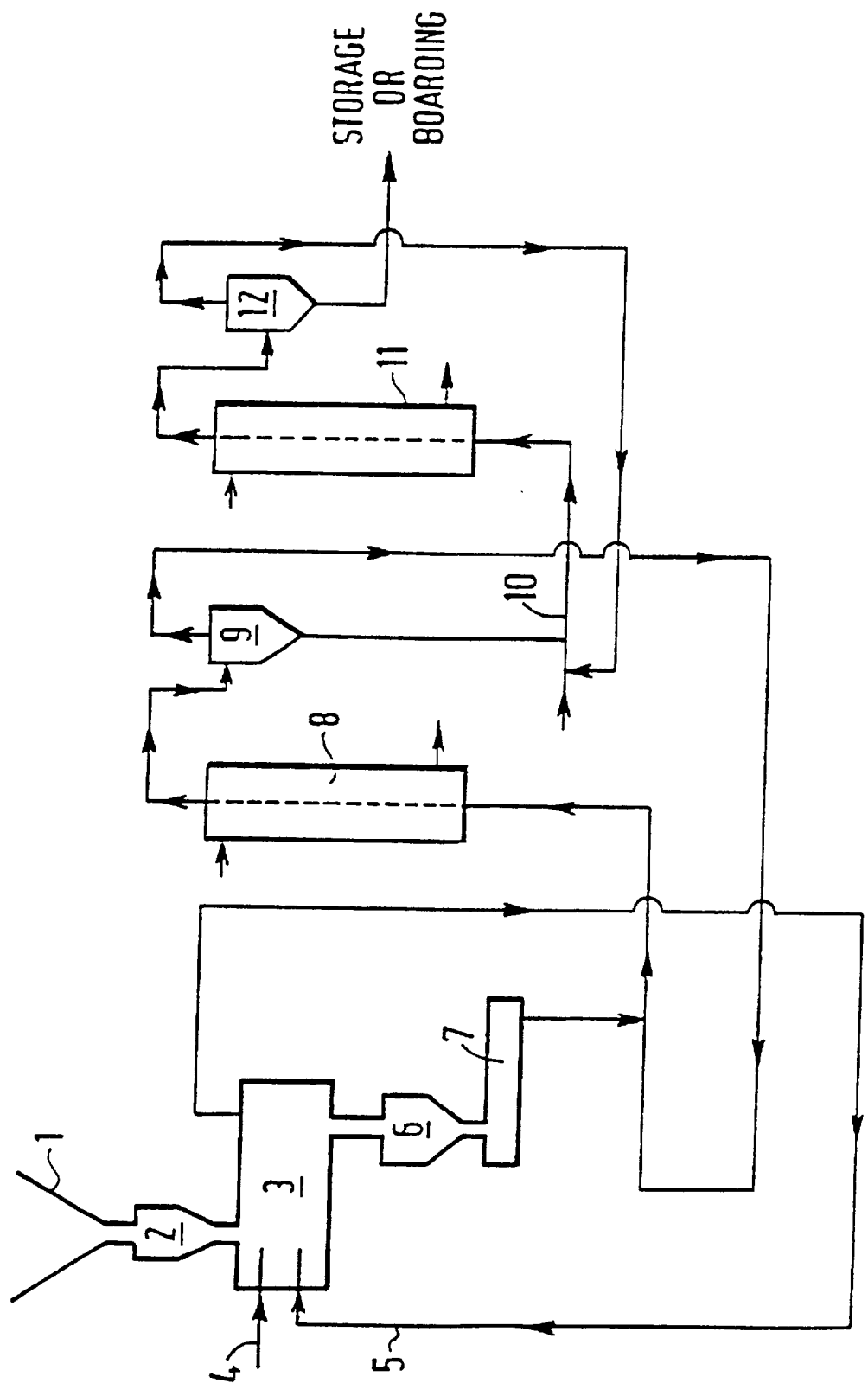

ACETYLATION OF LIGNOCELLULOSIC MATERIALS

This application is a 371 of PCT/GB95/00371, filed Feb. 23, 1995.

The present invention relates to a process for the production of acetylated lignocellulosic materials wherein the lignocellulosic material is treated with acetic anhydride.

By the expression "lignocellulosic materials" is meant here and throughout the specification a material in any shape or form such as eg shreds, fibres, splinters and shives, and which are derivable from a source comprising wood, sisal, jute, coconut and/or other plant material and which have optionally been subjected to a pretreatment with a non-acetylating chemical such as eg sodium acetate in order to improve subsequent acetylation thereof will hereafter be referred to as "LM" for convenience.

It is well known in the art to improve the physical characteristics of LMs by treatment with acetic acid and/or acetic anhydride. One of the problems with systems which use the immersion technique is that they are usually batch processes which need drainage facilities for the liquid in which the LM is immersed. A single step process of this type also does not ensure acetylation of the lignocellulosic material to the desired degree nor the removal of all of the unreacted chemicals in the treated product.

It has now been found that the above problems can be mitigated by treating the LM in two stages, if necessary, in a continuous process.

Accordingly, the present invention is a process for the acetylation of lignocellulosic materials (LM) comprising a. bringing the LM into intimate contact with an acetylating agent comprising acetic anhydride as the major component at a temperature from 80°–140° C. and b. bringing the acetylated LM from step (a) into contact with a heated gas inert under the reaction conditions in a stripper at a temperature above 140° C. and reducing the acetic acid or acetic anhydride content of the acetylated LM produced in step (a) to below 10% by weight by stripping.

In the process, the acetylating agent used in step (a) suitably comprises at least 50% w/w of acetic anhydride, preferably at least 60% w/w and most preferably at least 70% w/w and typically contains 90% acetic anhydride and 10% acetic acid. This agent may be in the form of a liquid, a vapour or a mixture of the two. Thus the weight ratio of liquid to vapour in the acetylating agent present in the reactor used in step (a) may be anything within the range from 100% of one to 100% of the other, but is suitably from 1:5 to 5:1 and is preferably 1:2. The acetylating agent used in step (a) is pre-heated to a temperature in the region from 80°–140° C., preferably from 110°–130° C. using eg an oil jacket or a steam coil.

The LM is contacted with the acetylating agent in a first reactor. The acetylating reactor is suitably rendered gas tight eg by compaction using eg a plug screw feeder, at the point of entry into the reactor so as to minimise ingress of air into the acetylation reaction or egress of acetic anhydride out of this first reactor. This problem of egress of acetic anhydride can be minimized by operating the first reactor at a pressure which is slightly below atmospheric and is also a safety feature of the process. The compacted LM is then introduced into the first reactor which is suitably a screw-conveyor at the same time injecting into said reactor the hot acetylating agent. During this step, the compacted LM is dispersed (in order to loosen the LM strands and to spread it more thinly) using a dispersing device located at the entrance to this first reactor and thereby facilitates intimate contact between the LM and the acetylating agent. In this reactor, the rate of injection of the hot acetylating agent is suitably such that the ratio of the agent to the LM is suitably in the range from 1:1 to 10:1 by weight, preferably from 3:1 to 7:1, eg 5:1 by weight. During this acetylation reaction, which is exothermic, the reaction temperature is maintained substantially constant which may be achieved by several conventional means, eg by controlling the pressure in the reactor, or, by vapourization of the acetylating chemicals, or, by control of the rate of flow of the acetylating agent into the first reactor using flow control valves and monitoring the rate of flow, or, by controlling the composition of the hot acetylating agent injected into the reactor. It is preferable to achieve this temperature control by the vapourization method whereby the vapour leaving the first reactor is such that it is at its dewpoint. The amount of acetic anhydride in the acetylating agent in the vapour at its dewpoint may be in the range from 30–95% by weight, preferably 70% by weight, which can be filtered to remove any suspended LM therein and recycled.

The resultant acetylated LM from step (a) suitably contains a controlled amount of liquid which may be up to 110% by weight of the acetylated LM but is preferably eg about 40% by weight. The amount of liquid in the acetylated LM can be controlled by controlling the flow rate and/or the reaction temperature.

In order to proceed with step (b), the acetylated LM from step (a) containing about 40% by weight of liquid is suitably re-compacted using a plug screw feed as described previously and dispersed (in order to loosen the LM strands and to spread it more thinly) using a device similar to that used in the acetylation reactor and in order to create a gas tight seal in the stripper. However, the same effect may be achieved using eg a rotary valve. The gas inert under the reaction conditions is suitably nitrogen, argon, carbon dioxide or the like which is heated before it is introduced at a point after the acetylated LM is dispersed so as to entrain said dispersed, acetylated LM and to transport it to the stripper. The hot inert gas is at a temperature above 140° C., suitably from 140°–220° C., preferably from 185°–195° C. and the second reactor is suitably operated at a pressure of 100–150 KPa. In the stripper, the acetylated LM is brought into contact with the hot inert gas. The function of this step (b) is to reduce the content of acetylating medium remaining in the acetylated LM emerging from step (a) ie by stripping. Thus, vapours removed from this reactor can be recirculated to the hot acetylating agent used in the first reactor.

The duration of the acetylation reaction of the LM in step (a) will be determined by the degree of acetylation desired and the nature and amount of the acetylatable material present in the LM. Thus the degree of acetylation is suitably such that the acetylated LM achieves a weight gain of at least 2%, preferably at least 5% and more preferably from 5–25% by weight.

The stripped, acetylated LM product from step (b) can be further processed in a hydrolysis chamber in order to remove or at least minimize the odor of the chemicals in the treated LM. For instance, the stripped product which is usually at an elevated temperature of about 130°–160° C. may be dispersed (in order to loosen the LM strands and to spread it more thinly) and entrained in a current of steam optionally with one or more other entraining gases. It is preferable to use superheated steam and in this instance, any residual unreacted acetic anhydride remaining adsorbed or occluded in the acetylated LM is hydrolyzed to acetic acid and removed overhead as a mixture of steam and acetic acid from the hydrolysis chamber. This mixed vapour may be recirculated to the superheated steam being introduced into the hydrolysis chamber. The effect of this step is that it significantly reduces the acetic acid or anhydride odor of the treated LM product by removing substantially all of the acetic anhydride therefrom and also most of the acetic acid therein. The amount of acetic acid left behind in the acetylated product is suitably less than 0.5% w/w.

The acetylated LM after removal of any residual anhydride using superheated steam and emerging from the hydrolysis chamber is usually at a temperature of about 150° C. This product can be sent either directly to an adjoining plant where said product can be formed into the desired shapes eg boards, or, can be subjected to a further humidifying and a cooling step in order to bag the material for storage and distribution. This may be achieved by passing a current of steam and air over the treated LM emerging from the hydrolysis chamber so as to cool the treated LM to about 40° C. and to humidify it.

The process of the present invention is particularly suitable for acetylating fibres of LM, especially wood fibres, which may vary in dimensions eg from 0.03 mm to 4 mm. Furthermore, the process of the present invention can be operated batchwise or continuously, an option not available in the conventional processes used hitherto.

BRIEF DESCRIPTION OF THE DRAWING

The present invention is further illustrated with reference to the accompanying schematic flow diagram and the associated description below.

Raw LM eg the fibre is fed via a hopper (1) to a plug-screw feeder (2) where the fibre is compacted to reduce the permeability of the fibre to gas flow and to render the acetylating reactor gas tight. The plug-screw feeder (2) discharges the compacted fibre to the first reactor (3) which is purged with nitrogen before the injection of a pre-heated acetylating agent which is a mixture of acetic acid (about 10% by wt) and acetic anhydride (about 90% by wt) both in liquid and in vapour form along lines (4) and (5) respectively into said reactor (3). The compacted fibre is dispersed with a dispersing device (not shown) located at the entrance of the compacted material into reactor (3) as the fibre is brought into contact with the acetylating agent. Reactor (3) is maintained at a pressure slightly below atmospheric in order to prevent back flow of the acetylating agent into the plug-screw feeder or into lines (4) and (5). Reactor (3) is maintained at a temperature of about 120° C. by means of steam heating. The acetylation of the fibre is an exothermic reaction and the reaction temperature is maintained by the vapourization of the liquid components of the acetylating agent therein. Chemical vapour at its dewpoint, containing about 70% by weight acetic anhydride emerges overhead from this reactor and is filtered before being recovered and recycled. The amount of liquid in the acetylated fibre emerging from the base of reactor (3) is controlled at about 40% by weight and this fibre is re-compacted in a further plug-screw feeder (6) before being dispersed again in a dispersing device (7) and subjected to a further treatment with the inert gas, eg nitrogen heated to about 190° C. The acetylated fibre so treated is entrained in the heated gas stream emerging from the base thereof and transported to a stripper (8) which is a steam jacketed circulation stripper where the chemicals adsorbed or occluded in the acetylated fibre are evaporated. The overheads from the circulation stripper (8) entraining the acetylated fibre are fed into a circulation cyclone (9) where hot acetylated fibre is recovered from the base thereof and is fed through a cell feeder (not shown) into line (10). In line (10) the acetylated fibre is dispersed in and entrained by a mixture of superheated steam and some acetic acid vapour (from partly recycled streams) and is then fed into a steam stripper (11). In (11), any residual acetic anhydride in the acetylated fibre is hydrolyzed to acetic acid and the acetic acid is stripped out. The overheads from the steam stripper (11), which are at a temperature of about 150° C., are fed into a steam stripper cyclone (12) where the acetylated fibre is separated from the vapours and recovered from the base thereof whereas the acidic vapours are recovered overhead therefrom to be processed and recycled. The acetylated fibres substantially free of all free acids and anhydrides (and hence the odors of these components) recovered from the base of (12) can either be sent to an adjacent board manufacturing facility (not shown) directly or can be humidified and cooled for the purposes of bagging and storage (not shown).

The present invention is further illustrated with reference to the following Example:

EXAMPLE

A mixture of fibres of spruce and pine (1.5 g) was acetylated for 10 minutes with a flow of saturated acetic anhydride vapour (containing 5% w/w of acetic acid) at its dewpoint at atmospheric pressure. The total acetyl content achieved by this method was 15.5% and the residual acid on the acetylated fibre as defined below was 74.6% w/w. The acetylated fibre was then stripped using varying nitrogen flows as shown in the Tables below. The amount of acetylating agent left on the fibre at various stages during this stripping step is expressed as acid (method used to determine level is water based, therefore all anhydride is hydrolyzed to acetic acid). The results are shown in Tables 1 and 2 below:

$$\text{Residual acid \%} = \frac{\text{Wt of acid determined by titration}}{(\text{Wt of acid + fibre})} \times 100$$

TABLE 1

$N_2$ flow = 2.4 l/minute through 1.5 g of acetylated fibre at 190° C.

| Stripping Time in Minutes | Residual Acid (%) |
|---|---|
| 0 | 74.6 |
| 1 | 64.6 |
| 3 | 10.7 |
| 5 | 2.9 |
| 10 | 0.3 |

TABLE 2

$N_2$ flow = 5.4 l/minute through 1.5 g of acetylated fibre at 190° C.

| Stripping Time in Minutes | Residual Acid (%) |
|---|---|
| 0 | 74.6 |
| 1 | 48.1 |
| 2 | 17.2 |
| 3 | 5.7 |
| 5 | 0.6 |

We claim:

1. A process for the acetylation of lignocellulosic mate rials (LM) comprising
   a. bringing the LM into intimate contact in a reactor wit an acetylating agent comprising acetic anhydride as th major component and acetic acid as a minor component at a temperature from 80°–140° C. and b. bringing the acetylated LM from step (a) into contact with a heated gas inert under the reaction conditions in a stripper at a temperature above 140° C. and reducing the acetic acid or acetic anhydride content of the acetylated LM produced in step (a) to below 10% by weight by stripping.

2. A process for the acetylation of lignocellulosic materials (LM) comprising a. bringing the LM into intimate contact in a reactor with an acetylating agent comprising acetic anhydride as the major component at a temperature from 80°–140° C. and b. bringing the acetylated LM from step (a) into contact with a heated gas inert under the reaction conditions in a stripper at a temperature above 140° C. and reducing the acetylation content of the acetylated LM produced in step (a) to below 10% by weight by stripping.

3. A process according to claim 1 or claim 2 wherein the acetylating agent used in step (a) comprises at least 20% w/w of acetic anhydride.

4. A process according to claim 1 or claim 2 wherein the acetylating agent used in step (a) comprises 90% w/w acetic anhydride and 10% w/w acetic acid.

5. A process according to claim 1 or claim 2 wherein the acetylating agent is in the form of a liquid, a vapour or a mixture of the two.

6. A process according to claim 2 or claim 5 wherein the weight ratio of liquid to vapour in the acetylating agent present in the reactor of step (a) is from 1:5 to 5:1.

7. A process according to claim 1 or claim 2 wherein the acetylating agent used in step (a) is pre-heated to a temperature in the region from 80°–140° C.

8. A process according to claim 1 or claim 2 wherein the reactor used in step (a) is maintained at a pressure below atmospheric during the acetylation reaction.

9. A process according to claim 1 or claim 2 wherein the rate of injection of the hot acetylating agent into the reactor of step (a) is such that the ratio of the acetylating agent to the LM is in the range from 1:1 to 10:1 by weight.

10. A process according to claim 1 or claim 2 wherein the acetylated LM from step (a) contains a controlled amount of liquid which may be up to 110% by weight of the acetylated LM.

11. A process according to claim 1 or claim 2 wherein the acetylated LM from step (a) is entrained in the gas inert under the reaction conditions which is heated before it comes into contact with the acetylated LM and transported to step (b).

12. A process according to claim 1 or claim 2 wherein the inert gas comprises nitrogen, argon and/or carbon dioxide and is at a temperature above 140° C.

13. A process according to claim 1 or claim 2 wherein the degree of acetylation achieved is such that the acetylated LM achieves a weight gain of at least 2%.

14. A process according to claim 1 or claim 2 wherein the stripped, acetylated LM product from step (b) is further processed in a hydrolysis chamber by contact with a hot gas comprising steam whereby any residual unreacted acetic anhydride remaining adsorbed or occluded in the acetylated LM is hydrolysed to acetic acid and removed overhead as a mixture of steam and acetic acid from the hydrolysis chamber so that the acetic acid in the acetylated product is less than 0.5% w/w.

* * * * *